(12) United States Patent
Senf, Jr. et al.

(10) Patent No.: US 10,107,536 B2
(45) Date of Patent: Oct. 23, 2018

(54) TRANSPORT REFRIGERATION SYSTEM AND METHODS FOR SAME TO ADDRESS DYNAMIC CONDITIONS

(75) Inventors: Raymond L. Senf, Jr., Central Square, NY (US); John R. Reason, Liverpool, NY (US)

(73) Assignee: CARRIER CORPORATION, Farmington, CT (US)

( * ) Notice: Subject to any disclaimer, the term of this patent is extended or adjusted under 35 U.S.C. 154(b) by 1556 days.

(21) Appl. No.: 13/511,800

(22) PCT Filed: Dec. 9, 2010

(86) PCT No.: PCT/US2010/059606
§ 371 (c)(1),
(2), (4) Date: May 24, 2012

(87) PCT Pub. No.: WO2011/075373
PCT Pub. Date: Jun. 23, 2011

(65) Prior Publication Data
US 2012/0247138 A1    Oct. 4, 2012

Related U.S. Application Data

(60) Provisional application No. 61/288,017, filed on Dec. 18, 2009.

(51) Int. Cl.
*F25B 41/00*    (2006.01)
*F25B 49/00*    (2006.01)
*F25B 49/02*    (2006.01)

(52) U.S. Cl.
CPC .......... *F25B 49/02* (2013.01); *F25B 2400/13* (2013.01); *F25B 2600/111* (2013.01); *F25B 2600/2509* (2013.01); *F25B 2600/2513* (2013.01); *Y02B 30/743* (2013.01)

(58) Field of Classification Search
CPC ............... F25B 49/02; F25B 2400/13; F25B 2600/111; F25B 2600/2509; F25B 2600/2513; Y02B 30/743
USPC ....................................................... 62/196.1
See application file for complete search history.

(56) References Cited

U.S. PATENT DOCUMENTS

| | | |
|---|---|---|
| 3,827,250 A | 8/1974 | Kerschbaumer et al. |
| 4,377,074 A | 3/1983 | Jardine |
| 4,549,404 A | 10/1985 | Lord |
| 4,850,197 A | 7/1989 | Taylor et al. |

(Continued)

FOREIGN PATENT DOCUMENTS

| | | |
|---|---|---|
| CN | 1779384 A | 5/2006 |
| EP | 0146486 | 6/1985 |

(Continued)

OTHER PUBLICATIONS

International Search Report and Written Opinion dated Jun. 9, 2011.

*Primary Examiner* — Larry Furdge
(74) *Attorney, Agent, or Firm* — Cantor Colburn LLP

(57) ABSTRACT

In a refrigeration system having a compressor, a heat rejection heat exchanger, a heat absorption heat exchanger, and a controller for controlling the same, embodiments of a system, apparatus and methods for the same can control at least one refrigeration system component such as an expansion valve responsive to dynamic system conditions.

9 Claims, 6 Drawing Sheets

(56) References Cited

U.S. PATENT DOCUMENTS

| | | | |
|---|---|---|---|
| 4,938,029 A | 7/1990 | Shaw | |
| 5,079,929 A | 1/1992 | Alsenz | |
| 5,157,933 A | 10/1992 | Brendel | |
| 5,161,382 A | 11/1992 | Missimer | |
| 5,174,123 A | 12/1992 | Erickson | |
| 5,197,297 A | 3/1993 | Brendel et al. | |
| 5,197,670 A | 3/1993 | Hanson et al. | |
| 5,528,908 A | 6/1996 | Bahel et al. | |
| 5,557,938 A | 9/1996 | Hanson et al. | |
| 5,572,879 A | 11/1996 | Harrington | |
| 5,582,022 A | 12/1996 | Heinrichs et al. | |
| 5,598,718 A | 2/1997 | Freund et al. | |
| 5,603,227 A | 2/1997 | Holden et al. | |
| 5,626,027 A | 5/1997 | Dormer et al. | |
| 5,669,223 A | 9/1997 | Haley et al. | |
| 5,768,901 A | 6/1998 | Dormer et al. | |
| 5,996,364 A | 12/1999 | Lifson et al. | |
| 6,044,651 A | 4/2000 | Reason et al. | |
| 6,058,729 A | 5/2000 | Lifson et al. | |
| 6,138,467 A | 10/2000 | Lifson et al. | |
| 6,141,981 A | 11/2000 | Reason et al. | |
| 6,148,627 A | 11/2000 | Reason et al. | |
| 6,196,012 B1 | 3/2001 | Reason et al. | |
| 6,301,911 B1 * | 10/2001 | Reason et al. | 62/196.2 |
| 6,318,100 B1 | 11/2001 | Brendel et al. | |
| 6,318,101 B1 | 11/2001 | Pham et al. | |
| 6,321,549 B1 | 11/2001 | Reason et al. | |
| 6,374,631 B1 | 4/2002 | Lifson et al. | |
| 6,405,550 B1 | 6/2002 | Reason et al. | |
| 6,543,242 B2 | 4/2003 | Reason et al. | |
| 6,571,576 B1 | 6/2003 | Lifson et al. | |
| 6,679,074 B2 | 1/2004 | Hanson | |
| 6,684,650 B2 | 2/2004 | Weyna et al. | |
| 6,718,781 B2 | 4/2004 | Freund et al. | |
| 6,860,114 B2 | 3/2005 | Jacobsen | |
| 6,883,341 B1 | 4/2005 | Lifson | |
| 6,910,341 B2 | 6/2005 | Srichai et al. | |
| 6,955,058 B2 | 10/2005 | Tares et al. | |
| 7,143,594 B2 | 12/2006 | Ludwig et al. | |
| 7,216,505 B2 | 5/2007 | Braz | |
| 7,228,691 B2 | 6/2007 | Street et al. | |
| 7,353,660 B2 | 4/2008 | Lifson et al. | |
| RE40,499 E | 9/2008 | Lifson | |
| 7,523,623 B2 | 4/2009 | Taras et al. | |
| 2003/0010046 A1 * | 1/2003 | Freund et al. | 62/222 |
| 2005/0235689 A1 * | 10/2005 | Lifson et al. | 62/513 |
| 2005/0262859 A1 | 12/2005 | Crane et al. | |
| 2008/0307813 A1 | 12/2008 | Lifson et al. | |
| 2008/0314057 A1 | 12/2008 | Lifson et al. | |
| 2009/0013701 A1 | 1/2009 | Lifson et al. | |
| 2009/0025410 A1 | 1/2009 | Tanaka et al. | |
| 2009/0031740 A1 | 2/2009 | Douglas | |
| 2009/0037142 A1 | 2/2009 | Kates | |
| 2009/0038322 A1 | 2/2009 | Senf Jr. et al. | |
| 2009/0095002 A1 | 4/2009 | McSweeney et al. | |
| 2009/0299534 A1 | 12/2009 | Ludwig | |
| 2010/0107661 A1 | 5/2010 | Awwad et al. | |
| 2010/0251750 A1 | 10/2010 | Lifson et al. | |
| 2011/0023514 A1 | 2/2011 | Mitra et al. | |
| 2011/0094248 A1 | 4/2011 | Taras et al. | |
| 2011/0132007 A1 | 6/2011 | Weyna et al. | |
| 2011/0247350 A1 | 10/2011 | Awwad et al. | |

FOREIGN PATENT DOCUMENTS

| | | |
|---|---|---|
| EP | 0522847 A2 | 1/1993 |
| EP | 0786632 | 7/1997 |
| EP | 0845642 A2 | 6/1998 |
| EP | 1038705 A2 | 9/2000 |
| EP | 1039252 A2 | 9/2000 |
| EP | 1039253 A1 | 9/2000 |
| EP | 1489368 | 12/2004 |
| EP | 2230474 A1 | 9/2010 |
| EP | 2379959 A1 | 10/2011 |
| GB | 2152245 | 7/1985 |
| GB | 2268256 | 1/1994 |
| WO | 2006118573 A1 | 11/2006 |
| WO | 2007070060 | 6/2007 |
| WO | 2007126523 A1 | 11/2007 |
| WO | 2008082408 A1 | 7/2008 |
| WO | 2008130358 | 10/2008 |
| WO | 2008130359 | 10/2008 |
| WO | 2008140454 | 11/2008 |
| WO | 2008143611 A1 | 11/2008 |
| WO | 2008147828 A1 | 12/2008 |
| WO | 2009041942 A1 | 4/2009 |
| WO | 2009041959 A1 | 4/2009 |
| WO | WO 2009069678 A1 * | 6/2009 |
| WO | 2009091401 | 7/2009 |
| WO | 2010002644 A1 | 1/2010 |
| WO | 2010077812 A1 | 7/2010 |
| WO | 2011049778 A1 | 4/2011 |

* cited by examiner

TRANSPORT REFRIGERATION SYSTEM AND METHODS FOR SAME TO ADDRESS DYNAMIC CONDITIONS

CROSS-REFERENCE TO RELATED APPLICATION

This application claims priority to U.S. Provisional Patent Application Ser. No. 61/288,017 entitled "Transport Refrigeration System and Methods for Same to Address Dynamic Conditions," filed on Dec. 18, 2009. The content of this application is incorporated herein by reference in its entirety.

FIELD OF THE INVENTION

This disclosure relates generally to transport refrigeration units and, more specifically, to methods and apparatus for dynamic conditions therein.

BACKGROUND OF THE INVENTION

A particular difficulty of transporting perishable items is that such items must be maintained within a temperature range to reduce or prevent, depending on the items, spoilage, or conversely damage from freezing. A transport refrigeration unit is used to maintain proper temperatures within a transport cargo space. The transport refrigeration unit can be under the direction of a controller. The controller ensures that the transport refrigeration unit maintains a certain environment (e.g., thermal environment) within the transport cargo space.

SUMMARY OF THE INVENTION

In view of the background, it is an aspect of the application to provide a transport refrigeration system, transport refrigeration unit, and methods of operating same that can maintain cargo quality by selectively controlling transport refrigeration system components.

One embodiment, according to the application can include a control module for a refrigeration system. The control module includes a controller for controlling the refrigeration system or a component thereof based on at least dynamic system conditions.

One embodiment, according to the application can include a transport refrigeration system and/or process to control system superheat such as the degree of compressor superheat and/or evaporator superheat.

One embodiment, according to the application can include a process for controlling economizer flow rate during a cooling cycle in a refrigeration system having a compressor, a condenser, an evaporator, and a controller for controlling an expansion valve.

One embodiment, according to the application can include a controller for controlling evaporator expansion valve or evaporator input flow rates when the condenser fan is not enabled or a Condensing Pressure Control (CPC) operation mode is entered in a refrigeration system having a compressor, a condenser, and an evaporator.

In an aspect of the application, a transport refrigeration system having a compressor, a condenser, an evaporator, an economizer, a second expansion valve coupled between the economizer and the compressor, and a controller, and a first expansion valve upstream of the evaporator, a process can include detecting a capacity increase mode transition for the economizer, and selectively operating the second expansion valve upstream through a transition from a first flow rate to a second higher flow rate over a prescribed time period.

In an aspect of the application, a computer program product including a computer usable storage medium to store a computer readable program that, when executed on a computer, causes the computer to perform operations to operate a transport refrigeration unit, the operations can include operate the transport refrigeration unit in a first mode, control an economizer to transition the transport refrigeration unit to a higher capacity mode, and increase gradually a gas flow rate from the economizer over a prescribed time at said transition.

In an aspect of the application, a refrigerant system can include a compressor, a condenser downstream of the compressor, an expansion device downstream of the condenser, and an evaporator downstream of the expansion device, and a refrigerant circulating from the compressor to the condenser, through the expansion device and the evaporator and then returning to the compressor and a control module to control a system component to maintain a constant mass flow rate across a varying differential pressure change.

BRIEF DESCRIPTION OF THE DRAWINGS

For a further understanding of the invention, reference will be made to the following detailed description of the invention which is to be read in connection with the accompanying drawing, wherein.

DETAILED DESCRIPTION OF EXEMPLARY EMBODIMENTS

Figure 1:
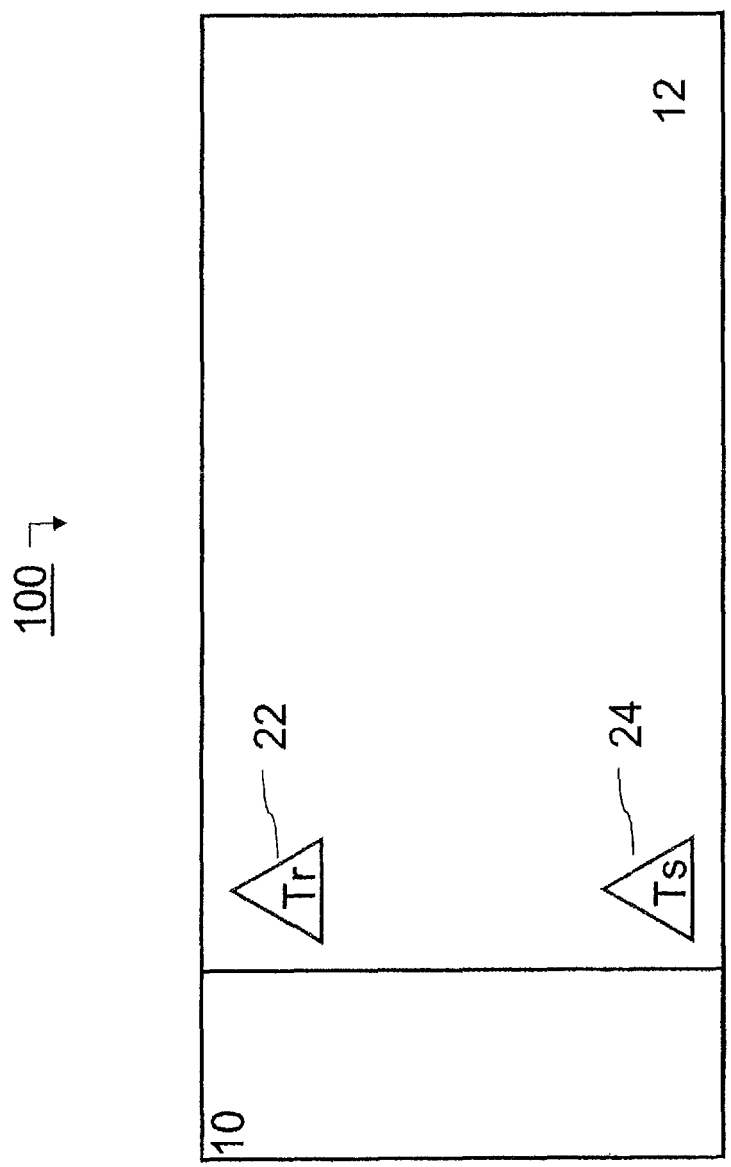
FIG. 1 is a diagram that shows an embodiment of a transport refrigeration system according to the application.

Reference will now be made in detail to exemplary embodiments of the application, examples of which are illustrated in the accompanying drawings. Whenever possible, the same reference numerals will be used throughout the drawings to refer to the same or like parts.

FIG. 1 is a diagram that shows an embodiment of a transport refrigeration system. As shown in FIG. 1, a transport refrigeration system 100 can include a transport refrigeration unit 10 coupled to an enclosed space within a container 12. As shown in FIG. 1, the transport refrigeration unit 10 is configured to maintain a prescribed thermal environment within the container 12 (e.g., cargo in an enclosed volume).

In FIG. 1, the transport refrigeration unit 10 is connected at one end of the container 12. Alternatively, the transport refrigeration unit 10 can be coupled to a prescribed position on a side or more than one side of the container 12. In one embodiment, a plurality of transport refrigeration units can be coupled to a single container 12. Alternatively, a single transport refrigeration unit 10 can be coupled to a plurality of containers 12. The transport refrigeration unit 10 can operate to induct air at a first temperature and to exhaust air at a second temperature. In one embodiment, the exhaust air from the transport refrigeration unit 10 will be warmer than the inducted air such that the transport refrigeration unit 10 is employed to warm the air in the container 12. In one embodiment, the exhaust air from the transport refrigeration unit 10 will be cooler than the inducted air such that the transport refrigeration unit 10 is employed to cool the air in the container 12. The transport refrigeration unit 10 can induct air from the container 12 having a return temperature Tr (e.g., first temperature) and exhaust air to the container 12 having a supply temperature Ts (e.g., second temperature).

In one embodiment, the transport refrigeration unit 10 can include one or more sensors (wired or wireless) to continuously or repeatedly monitor conditions or operations for the transport refrigeration unit 10. As shown in FIG. 1, exemplary sensors can include a first temperature sensor 24 of the transport refrigeration unit 10 that can provide the supply temperature Ts and a second temperature sensor 22 of the transport refrigeration unit 10 that can provide the return temperature Tr to the transport refrigeration unit 10, respectively.

A transport refrigeration system 100 can provide air with controlled temperature, humidity or/and species concentration into an enclosed chamber where cargo is stored such as in container 12. As known to one skilled in the art, the transport refrigeration system 100 (e.g., controller 220) is capable of controlling a plurality of the environmental parameters or all the environmental parameters within corresponding ranges with a great deal of variety of cargos and under all types of ambient conditions.

Figure 2:
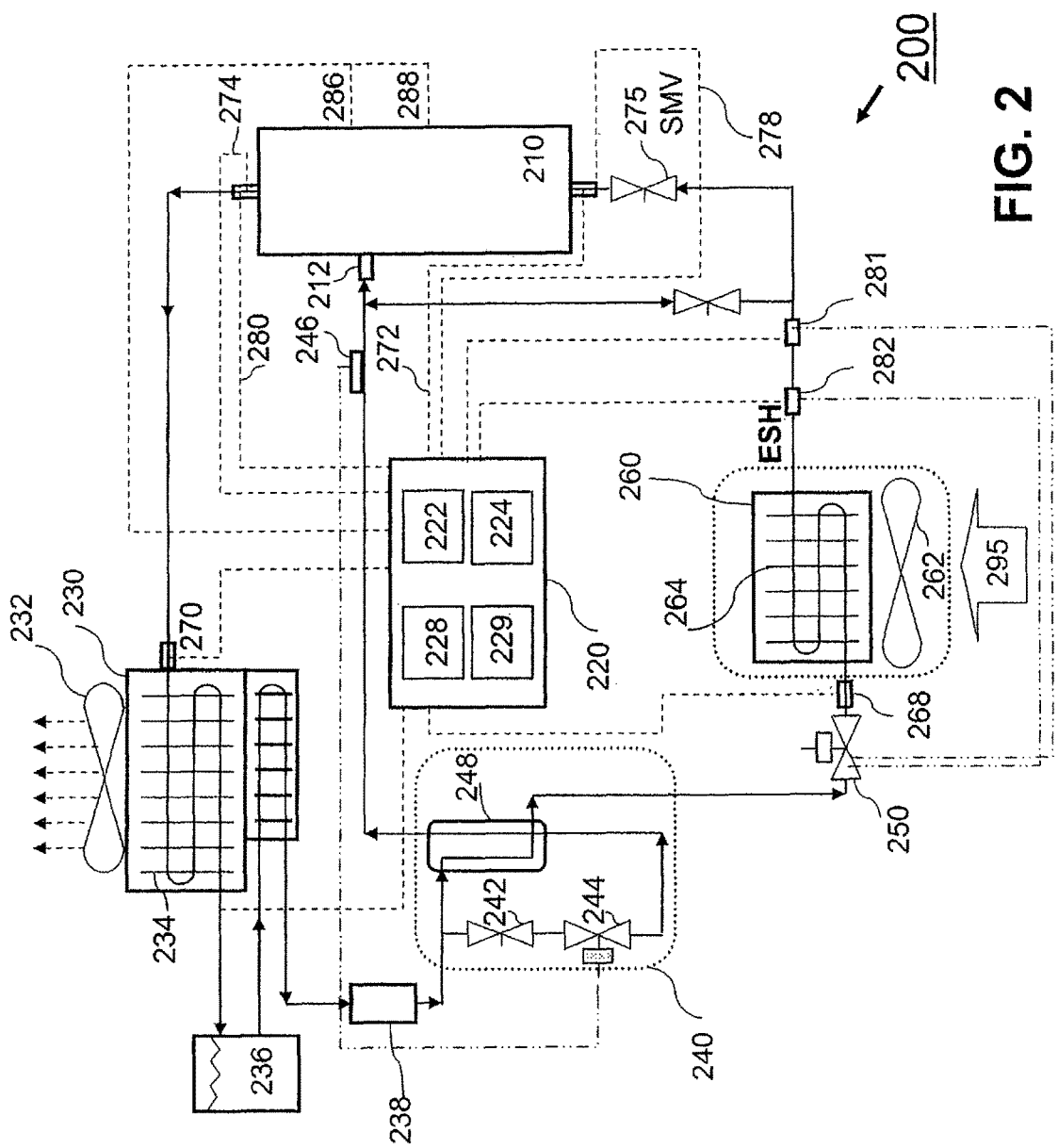
FIG. 2 schematically illustrates an exemplary embodiment of a transport refrigeration unit in accordance with the application.

FIG. 2 is a diagram that shows an embodiment of a transport refrigeration unit. As shown in FIG. 2, transport refrigeration unit 200 can be operatively coupled to a container (not shown), which can be used with a trailer, an intermodal container, a train railcar, a ship or the like, used for the transportation or storage of goods requiring a temperature controlled environment, such as, for example foodstuffs and medicines (e.g., perishable or frozen). The container can include an enclosed volume for the transport/storage of such goods. The enclosed volume may be an enclosed space having an interior atmosphere isolated from the outside (e.g., ambient atmosphere or conditions) of the container.

As shown in FIG. 2, compressor 210 can be a scroll compressor; however, other compressors such as reciprocating or screw compressors are possible without limiting the scope of the disclosure. A motor (not shown) can be used to drive the compressor 210. For example, a motor can be an integrated electric drive motor driven by a synchronous generator, a commercial power service an external power generation system (e.g., shipboard), a generator or the like. The compressor 210 can be a multi-stage compression device.

High temperature, high pressure refrigerant vapor exiting the compressor 210 can move to the air-cooled condenser 230, which can include a plurality of condenser coil fins and tubes 234, which receive air, typically blown by a condenser fan 232. By removing latent heat through the condenser 230, the refrigerant condenses to a high pressure/high temperature liquid and flows to a receiver 236 that can provide storage for excess liquid refrigerant during low temperature operations. From the receiver 236, the refrigerant can flow to a filter-drier 238 that can keep the refrigerant clean and dry.

The unit 200 can include an economizer. An economizer device 240 can increase the refrigerant subcooling. When the economizer device 240 is active, valve 242 can open to allow refrigerant to pass through an auxiliary expansion valve 244 having a sensing bulb 246 located upstream of an intermediate inlet port 212 of the compressor 210. The valve 244 can be controlled responsive to the temperature measured at the bulb 246, and serve to expand and cool the refrigerant that proceeds into an economizer counter-flow heat exchanger 248, which can additionally sub-cool the liquid refrigerant.

The refrigerant flows from economizer heat exchanger 248 of the economizer device 240 to an electronic evaporator expansion valve ("EVXV") 250. As the liquid refrigerant passes through the orifice of the EVXV 250, at least some of the liquid refrigerant can vaporize. The refrigerant then flows through the tubes or coils 264 of an evaporator 260. The evaporator 260 can absorb heat from the return air 295 (e.g., air returning from the box or container) and in so doing, vaporize some or all of the remaining liquid refrigerant in the evaporator 260. The return air 295 is preferably drawn or pushed across the tubes or coils 264 by at least one evaporator fan 262. The refrigerant vapor can be drawn from the evaporator 260 through a suction service valve 275 back into the compressor 210.

Many of the points in the transport refrigeration unit 200 can be monitored and controlled by a controller 220. Controller 220 can include a microprocessor 222 and an associated memory 224. The memory 224 of controller 220 can contain operator or owner preselected, desired values for various operating parameters within the unit 200 including, but not limited to, temperature set points for various locations within the unit 200 or the box, pressure limits, current limits, engine speed limits, and any variety of other desired operating parameters or limits with the unit 200 or a refrigeration system. In one embodiment, controller 220 can include a microprocessor board that contains microprocessor 222 and memory 224, an input/output (I/O) board 228 that can include an analog to digital converter 229. The I/O can receive temperature inputs and pressure inputs from various points in the system, AC current inputs, DC current inputs, voltage inputs and humidity level inputs. In addition, I/O board 228 can include drive circuits or field effect transistors ("FETs") and relays to receive signals or current from the controller 220 and in turn control various external or peripheral devices in the unit 200, such as the EVXV 250, for example.

Among exemplary sensors and/or transducers monitored by controller 220 can be a return air temperature (RAT) sensor 268 that input into the microprocessor 222 a variable resistor value according to the evaporator return air temperature. An ambient air temperature (AAT) sensor 270 that can provide microprocessor 222 an ambient air temperature value (e.g., read in front of the condenser 230). A compressor suction temperature (CST) sensor 272 that can input to the microprocessor a variable resistor value according to the compressor suction temperature. A compressor discharge temperature (CDT) sensor 274 that can detect a compressor discharge temperature inside the dome of compressor 210. An evaporator outlet temperature (EVOT) sensor 281 and an evaporator outlet pressure (EVOP) transducer 282 that can detect an outlet temperature value and an evaporator outlet pressure of evaporator 260. A compressor suction pressure (CSP) transducer 278 can provide microprocessor 222 a variable voltage according to a compressor suction value of compressor 210. A compressor discharge pressure (CDP) transducer 280 that can provide to microprocessor 222 a variable voltage according to a compressor discharge value of compressor 210. In addition, direct current sensor 286 and alternating current sensor 288 (CT1 and CT2, respectively) can detect current drawn by the compressor 210.

In one embodiment, the microprocessor 222 can use inputs from the EVOP sensor 282 and EVOT sensor 281 to calculate the evaporator coil evaporator superheat ESH, using algorithms understood by those of ordinary skill in the art. The microprocessor 222 can then compare the calculated evaporator superheat value ESH to a preselected, desired superheat value, or set point, which can be stored in memory 224. The microprocessor 222 can then actuate the EVXV 250 depending upon differences between actual and desired evaporator superheat ESH in order to approach or maintain the desired superheat setting (e.g., a prescribed superheat, a condition selected superheat, or the minimum superheat to maximize unit capacity). Microprocessor 222 may be programmed to operate at a prescribed setting or at the lowest setting of superheat that can be maintained or controlled, and that will reduce or prevent an operational flood back (e.g., escape of liquid refrigerant into the compressor). The prescribed or lowest setting value will vary depending upon the capacity and specific configuration of the unit 200. For example, such an operation value can be determined through experimentation by those of ordinary skill in the art. In one embodiment, such a level of superheat may then be used as the "base implementation" superheat or a base setting from which superheat offsets can be made in the event of various operating conditions and/or ambient conditions.

In the base implementation described above, it has been determined that the superheat generated in the evaporator 260 or the compressor 210 can exceed desired conditions or safety limits in some operating regimes. One example of such an operating regime can be dynamic refrigeration system operations or when operational transitions cause dynamic conditions or extreme or unrecoverable conditions in the transport refrigeration unit 200. Related art and conventional control techniques, for example, by controlling evaporator superheat ESH, were ineffective in preventing error conditions such as compressor flooding or compressor discharge overheating.

An embodiment of a method of operating a transport refrigeration system according to the application will now be described. The method embodiment shown in FIG. 3, can be implemented in and will be described using a transport refrigeration system embodiment shown in FIG. 2, however, the method embodiment is not intended to be limited thereby.

Figure 3:
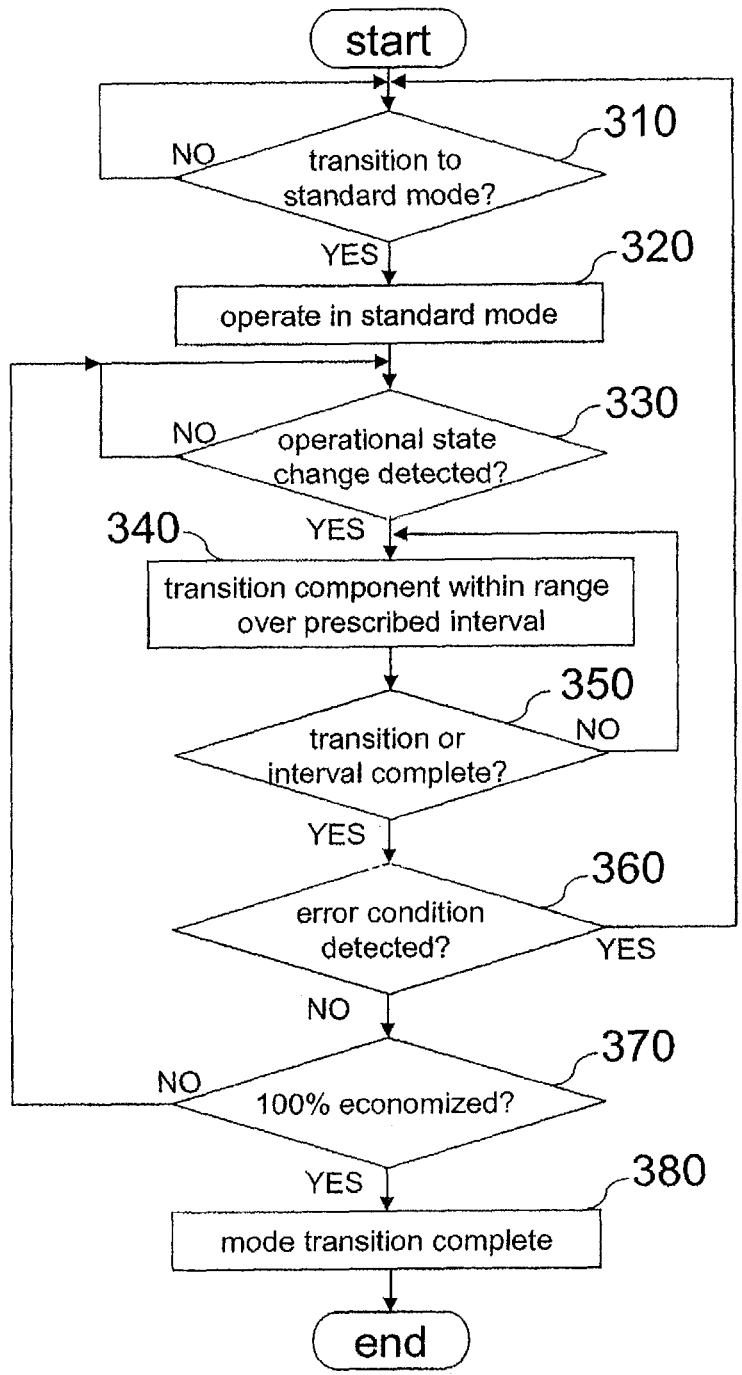
FIG. 3 is a block diagram collectively presenting a flow chart illustrating an exemplary embodiment of the process for controlling compressor pressure during operation of a refrigeration system.

As shown in FIG. 3, after a process starts, a transport refrigeration system, the transport refrigeration unit 200, or the controller 220 can be operated in a cooling mode and monitored for a transition to a standard mode (operation block 310). As shown in FIG. 3, the standard mode of the transport refrigeration unit 200 is intended as an operating mode where the transport refrigeration unit 200 is capable of a transition to economized mode. In one embodiment, the microprocessor 222 can enter the standard mode in accordance with the evaporator superheat ESH. In one embodiment, the controller 220 can enter the standard mode after a pull-down cooling mode that was initiated upon start-up of the transport refrigeration system. In one embodiment, the standard mode can be the base implementation cooling mode in accordance with the evaporator superheat ESH.

When the determination in operation block 310 is affirmative, the transport refrigeration unit 200 operates in the standard mode (operation block 320); otherwise control returns to operation block 310. For example, the determination in operation block 310 can be made repeatedly, periodically, intermittently, or responsive to an operator action or a sensed condition.

After entering the standard mode, the unit 200 can be monitored for an operation transition (operation block 330). In one embodiment, the economizer device 240 is monitored to determine when an operation state of the economizer device 240 is changed. For example, the economizer device 240 can be monitored by the controller 220 (e.g., microprocessor 222). In one embodiment, the operation state of the economizer device 240 can be monitored for operational transitions because it is difficult or impossible to predict operational transitions of the economizer device 240 because of the number of independent variables that influence such an operational state change of the economizer device 240.

In one embodiment, energizing the vapor injection flow of an economized transport refrigeration system is difficult to predict for any given condition because it is a function of multiple system parameters (e.g., speed, compression ratio, injection flow density). Turning the injection circuit of an economizer such as the economizer device 240 on can cause a sudden increase in compressor power and conventionally, the unit 200 (e.g., SMV) has been unable to respond quick enough to reduce total system power before engine stall. In one embodiment, energizing the vapor injection flow of an economized system can increase the instantaneous compressor power as much as 4-6 amps. Related art methods of using suction gas throttling to reduce compressor power after a sudden in rush of mid-stage gas simply do not work because of the slow reaction of the stepper suction throttling device. Conventionally, energizing the economizer device 240 can result in transport refrigeration system errors including but not limited to compressor flooding or diesel engine stall.

When the economizer device 240 transition is detected, (operation block 330 YES), the unit 200 or the controller 220 can controllably vary the injection gas flow rate on economizer injection system (e.g., higher capacity up-mode transitions) (operation block 340). For example, the microcontroller 222 can controllably increase the injection flow rate of the economizer through a range (e.g., 10% injection flow rate to 100% injection flow rate) over a set period of time. In one embodiment, pulse width modulated (PWM) control of the economizer injection solenoid valve can gradually ramp up the injection flow rate through a range (e.g., from 0% to 100%). The unit 200 can controllably transition a transport refrigeration unit component (e.g., economizer) from a first or current condition (e.g., closed) to a second or final condition (e.g., open) over a prescribed time period (e.g., 10 seconds, two minutes). In one embodiment, the injection flow can be pulsed over each period at an (higher) injection flow rate increased by a prescribed amount (e.g., 20%). Alternatively, the injection rate can increase stepwise at 10% duty cycle intervals over a 2-4 minute period. In one embodiment, the microprocessor 222 can soft start the economizer device 240 to controllably perform the economizer device 240 operational transitions. In one embodiment, the economizer device 240 can increase (or decrease) over an interval between 30 seconds and ten minutes long. The system component (e.g., economizer) can be monitored for completion of the controlled operational state transition (operation block 350). When the economizer device 240 has reached the top of the prescribed range (e.g., 50%, 100%) or interval in operation block 350, control can continue to operation block 360; otherwise control can return to operation block 340.

The transport refrigeration unit 200 can be checked (e.g., controller 220) for an error condition (operation block 360). Exemplary error conditions can include operating outside of allowed system conditions such as power limits or discharge pressure limits. When the error condition is detected (operation block 360 YES), control can return to operation block 310. In the absence of the error condition (operation block 360 NO), the economizer device 240 can be checked to determine if the economizer device 240 is operating at full capacity or 100% economized When the determination in operation block 370 is affirmative, the transition to the economized mode of transport refrigeration unit 200 is complete (operation block 380) and the process can end. When the determination in operation block 370 is negative, the transition to the economized mode of transport refrigeration unit 200 is not complete and control can return to operation block 330.

Embodiments using a soft starting approach to the economized system transition (e.g., economizer enabled) can allow the slower responding stepper type valves (e.g., SMV, EEV, SMV 275, EVXV 250)) more time to react to a slower and more gradual increase in injection mass flow (e.g., ESV, valve 242) and a respective compressor power increase. Embodiments of a system, controller and methods for using the same according to the application can reduce or eliminate the risk of the compressor 210 stalling the power supply (e.g., diesel engine) when capacity up shifts are required because the time based average injection flow will be controlled at a slower rate and/or the SMV will be able to react to such a gradual change. Further embodiments according to the application can reduce or minimize the compressor flood back risk because of poor EEV control during economizer mode transitions.

Embodiments described herein will still allow proper EEV and SMV control during low to high capacity mode transitions. Embodiments described herein can be implemented independent of other components or operations in the unit 200. For example, in some exemplary embodiments, backfit or current EEV, SMV control operations are not affected. Further, embodiments using soft-starting of the compressor can be applied to any two stage or economized compressor or transportation refrigeration systems in which engine power control is critical or where engine power is not critical.

An embodiment of a method of operating a transport refrigeration system according to the application will now be described. The method embodiment shown in FIG. 4, can be implemented in and will be described using a transport refrigeration system embodiment shown in FIG. 2, however, the method embodiment is not intended to be limited thereby.

Figure 4:
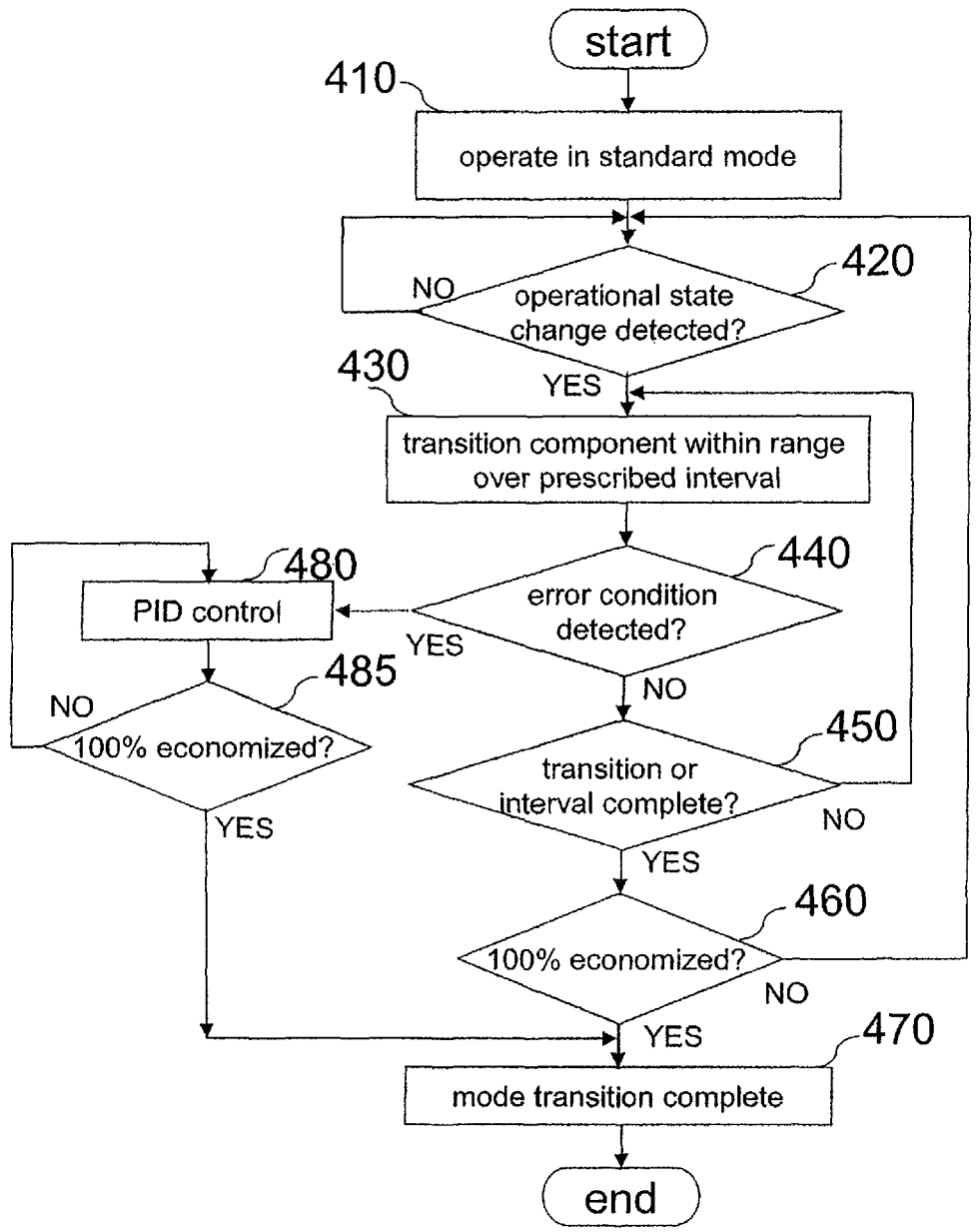
FIG. 4 is a block diagram collectively presenting a flow chart illustrating an exemplary embodiment of the process for controlling compressor pressure during operation of a refrigeration system.

As shown in FIG. 4, after a process starts, a transport refrigeration system, the transport refrigeration unit 200, or the controller 220 can be operated in a standard mode (operation block 410). As shown in FIG. 4, the standard mode of the transport refrigeration unit 200 is intended as an operating mode where the transport refrigeration unit 200 is capable of a transition to economized mode.

In the standard mode, the unit 200 can be monitored for an operation transition (operation block 420). In one embodiment, economizer device 240 is monitored to determine when an operation state of the economizer device 240 is changed. For example, the economizer device 240 can be monitored by the controller 220. In one embodiment, the operation state of the economizer device 240 can be monitored for operational transitions because it is difficult or impossible to predict operational transitions of the economizer device 240 because of the number of independent variables that influence such an operational state change of the economizer device 240.

When the economizer device 240 transition is detected, (operation block 420, YES), the unit 200 or the controller 220 can controllably vary the injection gas flow rate on economizer injection system (e.g., higher capacity up-mode transitions) (operation block 430). For example, the microcontroller 222 can controllably increase the injection flow rate of the economizer through a range (e.g., 10% injection flow rate to 50% injection flow rate or 100% injection flow rate) over a set period of time. In one embodiment, control of economizer injection solenoid valve (e.g., valve 242) such as but not limited to pulse width modulated (PWM) control of the economizer injection solenoid valve can gradually ramp up the injection flow rate through a range (e.g., from 0% to 100%). The unit 200 can controllably transition a transport refrigeration unit component (e.g., economizer) from a first or current condition (e.g., closed) to a second or final condition (e.g., open) over a prescribed time period (e.g., 10 seconds, two minutes). In one embodiment, the injection flow can be pulsed over each period at an (higher) injection flow rate increased by a prescribed amount (e.g., 20%). Alternatively, the injection rate can increase stepwise at 10% duty cycle intervals over a 2-4 minute period. In one embodiment, the microprocessor 222 can soft start the economizer device 240 to controllably perform the economizer device 240 operational transitions. In one embodiment, the economizer device 240 can increase (or decrease) over an interval between 30 seconds and ten minutes long.

During the economizer device 240 operational transitions the transport refrigeration unit 200 can be checked or monitored (e.g., controller 220) for an error condition (operation block 440). Exemplary error conditions can include operating outside of allowed system conditions such as power limits or compressor discharge pressure limits. When the error condition is not detected (operation block 460 NO), the system component (e.g., economizer) can be monitored for completion of the controlled operational state transition (operation block 450). When it is determined the economizer device 240 has reached the top of the prescribed range (e.g., 50%, 100%) or interval in operation block 450, control can continue and determine if the economizer device 240 is operating at full capacity or 100% economized (operation block 460); otherwise control can return to operation block 430. When the determination in operation block 460 is negative, control can return to operation block 420

When the error condition is determined (operation block 460 YES), an adaptive control of the transition of the economizer device 240 (or transport refrigeration unit 200) to the higher capacity mode can be implemented (operation block 480). For example, inputs to the adaptive PID can be system pressure, system power limit and actual power level (in use). In one embodiment, the adaptive control can be implemented by the controller 220 (e.g., microprocessor 222) or a PID (proportional-integral-derivative) control. In one embodiment, adaptive control of the economizer 240 can determine the error condition (e.g., system characteristic to exceed its threshold, over system power limit), and compare a current system characteristic to a threshold system characteristic and calculate a next operating level (e.g., injection gas flow rate) of a system component like the economizer 240, which may be slightly, somewhat or significantly higher (or lower) that the current operating level of the economizer 240. The adaptive control in operation block 480 does not allow the next operating level (e.g., of the economizer 240) to be set at a value that can cause the error condition (e.g., any monitored error condition). The next operating level can be evaluated to determine if the next operating level is equal to the 100% economized level (operation block 485). When the determination in operation block 485 is negative, the control continues to repeat the adaptive PID control (e.g., of the economizer using the valve 242) in operation block 480. In one embodiment, operation block 480 can be repeatedly, periodically, intermittently (e.g., responsive to an operator action or a sensed condition) performed until the determination in operation block 485 is affirmative.

When the determination in operation block 470 or operation block 485 is affirmative, the transition to the economized mode of transport refrigeration unit 200 is complete (operation block 470) and the process can end.

In another exemplary embodiment, pre-throttling the SMV can be controlled in anticipation of an economized unit 200 mode change. For example, the SMV can be pre-throttled before the transition to an energized economized mode. However, such anticipated control can be less efficient than embodiments described with reference to FIG. 3. For example, anticipation throttling of the SMV can reduce unit 200 capacity. Further, anticipation throttling can introduce evaporation, suction, and/or discharge pounds per square inch gauge (psig) perturbations that can influence proper electronic expansion valve control. In addition, anticipation throttling under selected conditions will not be compatible with existing EEV and SMV control during low to high capacity mode transitions.

Although, one embodiment shown in FIG. 3 was described with respect to PMW control, embodiments of the application are not intended to be so limited. For example, the flow rate can be varied by an electronic middle stage expansion valve or the electronic middle stage expansion valve could be used to soft start the injection flow of an economizer circuit.

As shown in FIGS. 3-4, the exemplary method embodiments can result in increased control for compressor discharge superheat during economizer operations.

Another embodiment of a method of operating a transport refrigeration system according to the application will now be described. The method embodiment shown in FIG. 5, can be implemented in and will be described using a transport refrigeration system embodiment shown in FIG. 2, however, the method embodiment is not intended to be limited thereby.

Figure 5:
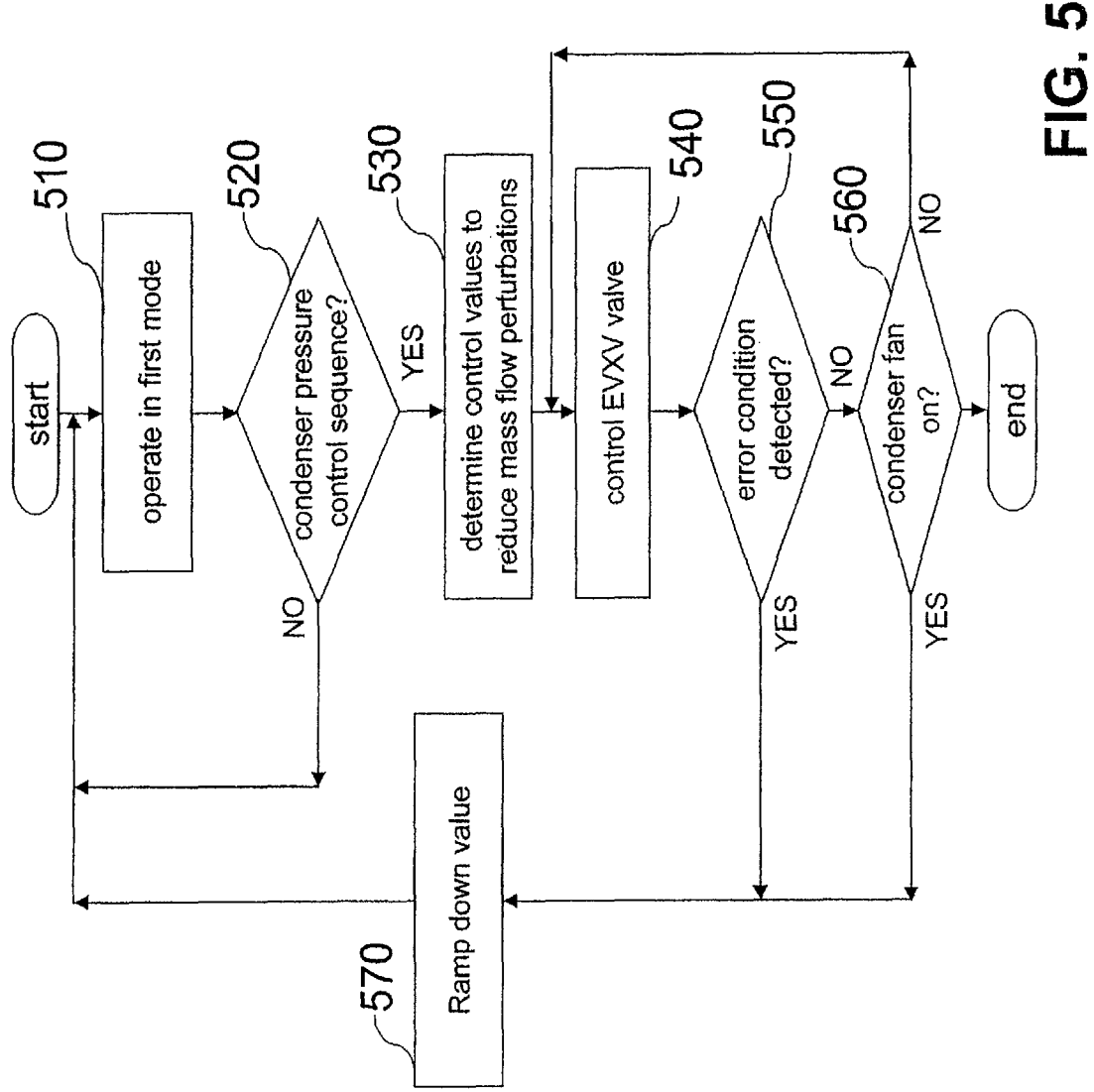
FIG. 5 is a block diagram collectively presenting a flow chart illustrating an exemplary embodiment of the process for controlling evaporator operations during operation of a refrigeration system.

As shown in FIG. 5, after a process starts, unit 200 operates in a first mode (operation block 510). Then, conditions are monitored that can result in a transition to Condensing Pressure Control (CPC) operation mode (operation block 520). For example, conditions that can result in the transition to CPC operation mode can include EEV valve position, compressor discharge pressure, evaporator superheat, and/or evaporator pressure.

CPC operation mode is an event where the condenser fan is turned off in response to system parameters (e.g., compressor discharge pressure too low). CPC operation mode is exited upon re-start or turning the condenser fan on. Conventional operations to transition to and perform in CPC operation mode would be known to one of ordinary skill in the art.

Embodiments according to the application can use conditions at initiation of the CPC operation mode to modify unit 200 components to reduce perturbation or unevenness in mass flow rate through components of the unit 200 or to reduce pressure fluctuations (e.g., increase) across the evaporator during CPC operation mode. In one embodiment, the EVXV valve control can be determined at the start of CPC operation mode to address changing pressure across the EVXV valve or the evaporator 260 when the condenser fan 232 is off.

When the determination in operation block 520 is affirmative, control continues to operation block 530; otherwise control returns to operation block 510. For example, the determination in operation block 520 can be made repeatedly, periodically, intermittently, or responsive to an operator action or a sensed condition.

In operation block 530, control, for example, pro-active control for at least one component of the unit 200 can be determined. According to embodiments of the application, during CPC operation mode, supplementary control to provide a more consistent mass flow rate through the expansion valve can be used. In one embodiment of a transport refrigeration system, during CPC operation mode an anticipated EVXV valve position can be used to gradually close the EVXV valve to reduce the likelihood that flooding will occur to the evaporator as the pressure across the EVXV valve is increasing in CPC operation mode. As the pressure continues to rise, the valve modification function will step close in an effort to maintain a more consistent mass flow rate through the expansion valve. Upon exiting CPC operation mode, the EVXV valve can be controllably returned to its position upon entering CPC control or entering the CPC operational mode.

The mass flow rate through the EVXV valve during a differential pressure change was determined to be proportional to the square root of the instantaneous pressure change across the valve divided by the original pressure drop across the EVXV valve. In accordance to the determined relationship, a new valve position can be approximated assuming that the valve orifice varies linearly with a % opening. In one embodiment, a current position or sequential EVXV valve position during the CPC operational mode can be approximated by exemplary Equation (1) (below).

In one embodiment, the anticipated EVXV valve position can be used to accurately step the EVXV valve closed so that little or no flooding can occur to the evaporator 260 as the pressure across the EVXV valve is increasing. As the pressure continues to rise, the valve modification function (e.g., exemplary equations 1-2) can step close to maintain a more consistent mass flow rate through the expansion valve.

One embodiment of Pressure Compensation Proactive Valve Control will now be described.

When the conditions for Condensing Pressure Control (CPC) are satisfied or true, the condenser fan 232 must shut off, valve control for the EVXV 250 can be performed to reduce or minimize the flood back to the compressor (operation block 530). An exemplary Valve Modifier Function in CPC operation mode is provided by Equation 2 and an exemplary EVXV valve position can be determined by Equation 1:

$$\text{Final EVXV position} = \text{EVXV\_PID} - \text{VMF} \qquad \text{Equation (1):}$$

$$\text{VMF} = \text{EXV\_1} - \text{EVXV\_1} * (\text{Sqrt}[\text{DeltaP\_C}/\text{DeltaP\_1}]) \qquad \text{Equation (2):}$$

where the following items are defined herein. EVXV_PID is a conventional PID (proportional-integral-derivative) output or normal PID output for the expansion valve (e.g., EVXV) control in the CPC operational mode as would be known to one skilled in the art. For example, inputs to the EVXV PID can be ESH. EVXV_1 is the value of the percentage open the EVXV valve is at the time when the condenser fan is shut off for CPC operation mode or control. DeltaP_1 is the value of the compressor discharge pressure minus the evaporator pressure determined at the time the condenser fan is shut off for CPC operation mode. DeltaP_C is the value of the discharge pressure minus the evaporator pressure measured every second or prescribed interval during CPC operation mode.

In one embodiment, the EVXV valve has overall control or supplemental control during the CPC operation mode according to Equations 1-2 (operation block 540). For example, EVXV 250 control according to embodiments of this application can operate in parallel (e.g., supplement) to conventional PID control of the EVXV 250 or can be used to replace conventional PID control of the EVXV 250. Next, an error condition can be monitored (operation block 550) and termination of the CPC operation mode can be monitored (operation block 560). When the determination in operation block 550 or operation block 560 is affirmative, the EVXV valve can be returned to the condition that the EVXV valve was in upon entry to the CPC operation mode (e.g., the modifications to the EVXV valve from Equations 1-2 are cancelled out or nullified). In one embodiment, the VMF (e.g., equation 2) can be immediately set to zero or terminated. In one embodiment, the VMF can be reduced to a zero value over a prescribed period of time. For example, the VMF can linearly or non-linearly ramp to zero over a 30 second period when the CPC control has turned the condenser fan back on. Alternatively, the VMF can reduce to zero over a time period between 5 and 120 seconds.

When the determination in operation block 550 and operation block 560 is negative, control returns to operation block 540 where the EVXV valve can have supplemental control responsive to pressure rise during CPC operation mode.

Exemplary conditions for operation block 550 can include determination that the evaporator pressure from the evaporator pressure sensor is out of range or the sensor failed and/or the compressor discharge pressure from the discharge pressure sensor is out of range or the sensor failed. Such conditions can be determined in the system 200. Further for example, error conditions can be determined to occur when the VMF EVXV position goes below a prescribed value (e.g., percentage opening) such as but not limited to an 8%, 10%, 12% opening EVXV position. In addition, error conditions can include compressor flooding or evaporator flooding.

Although, exemplary conditions were described for VMF during CPC operation mode, embodiments according to the application are not intended to be so limited. For example, additional limitations or modifications to VMF control can be considered. In one embodiment, when the evaporator superheat control error is greater than 20° F. at the time the CPC control mode is entered (e.g., when the condenser fan is turned off), the VMF control (e.g., Equation (2)) can be modified such as by additional control to reduce the calculated VMF by ½.

Figure 6:
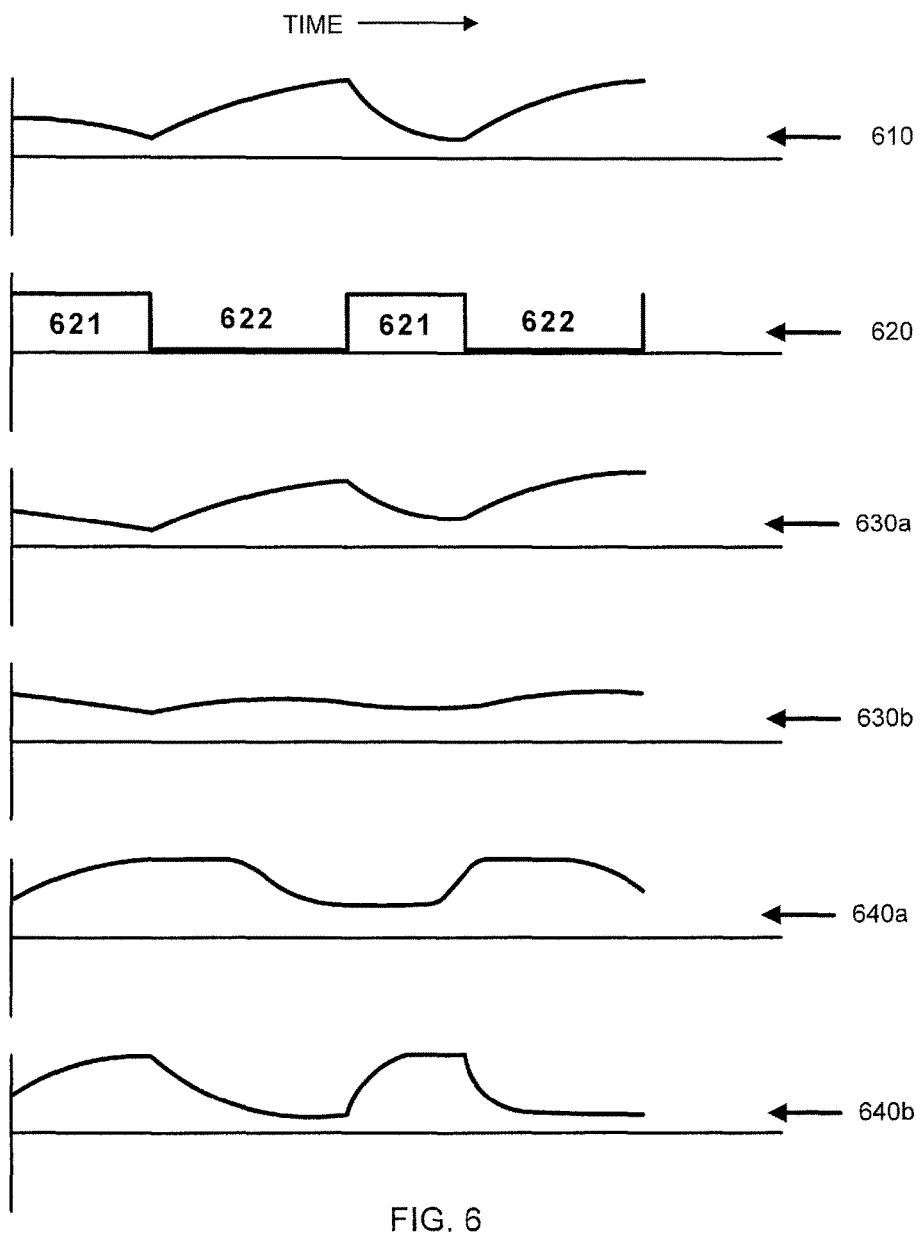
FIG. 6 is a diagram illustrating exemplary relationships between system parameters when a condenser fan is cycling on and off during operation of a refrigeration system.

FIG. 6 is a diagram illustrating exemplary relationships between system parameters when a condenser fan is cycling on and off during operation of a refrigeration system. As shown in FIG. 6, a condenser fan can cycle on 621 and off 622 as indicated by timing sequence 620. The CPC operational mode can be entered when the condenser fan cycles off 622. A timing sequence 610 of discharge pressure of a compressor illustrates increasing pressure (or differential compressor pressure) while the compressor fan is off and decreasing pressures when the compressor fan is on. A relative opening amount or percentage of the EVXV 250 is illustrated in FIG. 6 where 640*b* is in accordance with an embodiment of the application and 640*a* illustrates related art operations. Further, an evaporator pressure is illustrated in FIG. 6 where 630*b* is in accordance with an embodiment of the application and 630*a* illustrates related art operations.

In one embodiment, operation block 560 can be considered to be a check conducted to determine if conditions warrant returning to the base implementation mode of operation.

Embodiments and methods according to the application can provide robust engine and/or power control such as for diesel truck/trailer refrigeration units.

Embodiments and methods according to the application can provide improved compressor reliability by reducing or eliminating liquid flood back; reduced evaporator coil dehumidification by maintaining a more consistent saturated evaporating temperature; improved capacity and system efficiency by maintaining a more consistent refrigerant superheat in the evaporator; and a continuation of an initial or existing calculated evaporator expansion valve position from the PID.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment. For example, aspects and/or features of embodiments described with respect to FIG. 3 can be combined with aspects or features of embodiments described with respect to FIG. 4 or FIG. 5.

We claim:

1. In a transport refrigeration unit having a compressor, a condenser, an evaporator, an economizer, a second expansion valve coupled between the economizer and the compressor, and a controller, and a first expansion valve upstream of the evaporator, a process comprising:
    detecting a capacity increase mode transition for the economizer; and
    adaptively controlling an injection flow rate for the economizer during at least a portion of the capacity increase mode transition in response to one of available pressure, available power or available current to the transport refrigeration unit;
    wherein the adaptively controlling comprises selectively operating the second expansion valve through a transition from a first non-zero flow rate to a second higher non-zero flow rate using system conditions to control a rate of transition from the first non-zero flow rate to the second higher non-zero flow rate responsive to the capacity increase mode transition.

2. The process of claim 1, where the system conditions set an adaptive speed of transition from the first flow rate to the second flow rate or the system conditions set a prescribed time period of transition from the first flow rate to the second flow rate.

3. The process of claim 2, where the adaptive control is an adaptive PID control of an economizer gas injection valve, where the available power is power remaining to the transport refrigeration unit under a system threshold.

4. The process of claim 1, where the first flow rate is a non-zero injection flow rate less than 100%, the second flow rate is 100% injection flow rate, and the prescribed time period for transitioning from the first flow rate to the second flow rate is greater than ten seconds.

5. The process of claim 1, where the transition is step wise, intermittent, linear, non-linear, gradually, or continuous and where the prescribed time period is based on a throughput interval of the evaporator or the prescribed time period is 15-300 seconds, and where the step wise transition is a 10% increase every twenty seconds, every ten seconds, or every five seconds.

6. The process of claim 1, where the selectively operating comprises soft-starting the economizer.

7. The process of claim 1, where the selectively operating comprises proactively controlling a transition to a high capacity mode of the transport refrigeration unit, where detecting the mode transition detects energizing of a vapor flow of an economized transport refrigeration unit.

8. A computer program product comprising a non-transitory computer usable storage medium to store a computer readable program that, when executed on a computer, causes the computer to perform operations to operate a transport refrigeration unit, the operations comprising:
 operate the transport refrigeration unit in a first mode;
 control an economizer to transition the transport refrigeration unit to a higher capacity mode; and
 increase gradually a gas flow rate from the economizer to over a prescribed time at said transition;
 wherein the increasing the gas flow rate from the economizer comprises selectively operating a second expansion valve through the transition from a first non-zero flow rate to a second higher non-zero flow rate using system conditions to control a rate of transition from the first non-zero flow rate to the second higher non-zero flow rate responsive to the transition.

9. The computer program product of claim 8, where the operations comprising increase gradually a gas flow rate includes increasing from a 0% injection flow rate to a 100% injection flow rate.

\* \* \* \* \*